Patented June 13, 1933

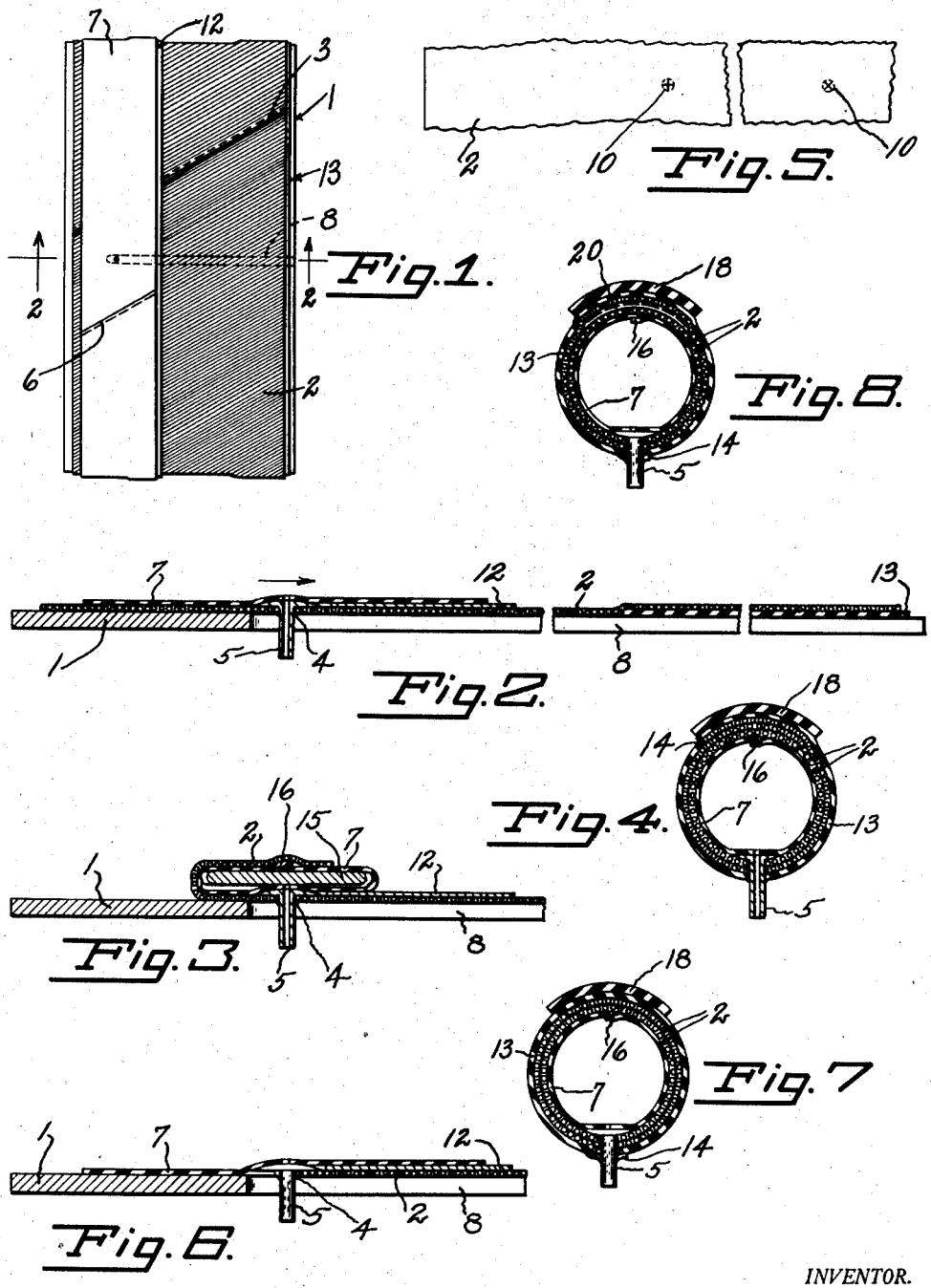

1,913,422

UNITED STATES PATENT OFFICE

GEORGE F. WIKLE, OF MILWAUKEE, WISCONSIN, ASSIGNOR TO ROLAND W. BOYDEN AND CHARLES A. DANA, RECEIVERS OF THE FISK RUBBER COMPANY

METHOD OF BUILDING PNEUMATIC TIRES

Application filed June 30, 1931. Serial No. 547,846.

This invention relates to the manufacture of pneumatic tires, such as bicycles and juvenile tires of the single tube type, and more particularly to a method of building such tires.

It has been customary in the past to construct these tires on rotatable drums by forming a tube of rubber and rolling the tube axially of the drum into bands of fabric successively placed about the drum, the number of bands corresponding to the number of plies desired in the tire and finally applying a cover band of rubber in a similar manner, care being taken to stagger the circumferential laps about the cross-section of the tire. A second method has been to lay up the various plies in stepped-off superposed relation in band form about a drum and seam the edges together about a strap in a single operation. The latter method has certain manufacturing advantages since the plies may be plied up in advance of being positioned on the drum but the excessive number of laps resulting from both of these prior methods have been a source of weakness in the tire and have rendered it difficult if not impossible to properly balance the tire.

I am aware that it was early proposed to manufacture single tube tires by rolling a wide band of fabric on a drum but without commercial success and the attempt was abandoned in favor of some form of the first method outlined.

It is an object of my invention to provide a method which will obviate the undesirable features of the product resulting from prior methods and produce an improved better balanced product manufactured under better control and at a lower manufacturing cost.

In the accompanying drawing which illustrates one manner of carrying out the method of my invention, Fig. 1 is a plan view of a building drum with certain of the tire elements assembled thereon;

Fig. 2 is a sectional view substantially on line 2—2 of Fig. 1;

Fig. 3 is a fragmentary view similar to that of Fig. 2 showing the manner of forming the lining tube;

Fig. 4 is a transverse sectional view of the tire resulting from the assembly of elements shown in the preceding figures;

Fig. 5 illustrates a preferred manner of cutting the valve cot holes;

Figs. 6 and 7 show a modified structure; and

Fig. 8 shows a further development of the form shown in Figs. 6 and 7.

Referring to the drawing, 1 designates a tire building drum on which is applied a strip of building fabric 2, which may be rubberized, bias cut, cord or square woven fabric, diagonally lapped as at 3 to form a band. The fabric band 2 is of a width to provide two or more plies in the finished tire as later described. Adjacent one edge (the left-hand edge as viewed in Figs. 1, 2 and 3) the band is apertured as at 4 to receive the valve cot 5 which is secured centrally of a strip of rubber lapped at 6 to form band 7 which is to comprise the lining of the tire, the drum 1 being provided with a slot 8 to receive the valve cot. Aperture 4 may take the form of a circular opening but there are advantages in merely slitting the fabric in cross formation as indicated at 10 in Fig. 5, so that points of fabric will be forced back when the cot is thrust through the slits to form a circular opening as indicated in dotted lines in Fig. 5. The displaced fabric tends to form a stiff reenforcement around the cot and if the slits of successive apertures are turned 45° from the preceding apertures as shown in Fig. 5 a uniform reenforcement will be provided around the cot.

The inner edge of band 7 is held separated from the fabric 2 by a strip of material 12, such as holland, which will prevent that edge of band 7 from adhering to the fabric. At the opposite edge of the fabric band 2 and partially underlying it is positioned a strip of cover rubber 13 lapped as at 14 to form a band.

With the parts assembled as above described and shown in Figs. 1 and 2, a conventional tire building strap 15 is positioned centrally of band 7 and the edges of the band, together with the adjacent edge of the fabric 2, are progressively folded over the strap in circumferential overlapping relation as indicated at 16 and the seam stitched down to form band 7 into an annular tube, enclosed in the edge of the fabric 2, the strap being slipped along as the seaming progresses and withdrawn when the starting point is reached, the final closure being made without the aid of the strap. As will be understood the width and thickness of the strap chosen will be appropriate to the size of the tire being built.

The tube formed by band 7 is now inflated and is progressively rolled along the drum in the direction of the arrow in Fig. 2 to snugly wrap the band 2 around tube 7 to form a multi-ply carcass covered by band 13. A tread strip 18 is added to complete the tire structure.

The widths of the various strips are made such and they are so assembled in Figs. 1 and 2 that all circumferential laps come under the tread, as will be apparent from Fig. 4, and the laps balance on either side of the central radial plane of the tire. A tire so made tends to hug the rim better than those of prior constructions and places the surplus material of the lap under the tread where resistance to puncture is most needed. For some types of service the positioning of the carcass laps at the base is satisfactory and may be desirable for manufacturing reasons and my method lends itself equally well to this construction as shown in Fig. 6. For a tire of the same size no change in the width of the strips is required. Aperture 4, however, is positioned closely adjacent the edge of the band 2 and band 7 is assembled on the latter (see Fig. 6) to extend beyond the edge of the fabric so that when the bands are rolled into tire form the edges of the carcass fabric 2 and cover strip 13 will be positioned at the base or opposite side of the central radial plane of the tire as shown in Figs. 7 and 8. Fig. 8 further illustrates how the present method lends itself to the insertion of additional strips such as strip 20, shown positioned between the carcass plies at the crown. Strip 20 or other desired strips map be incorporated in desired position in the tire merely by placing them in band form in the appropriate position on the flat assembly of Figs. 1, 2 or 6. It will thus be seen that an exceedingly simple, or a very complicated, balanced tire structure can be built by my method, since simple measurements or a template will assure accurate placing of the elements in the flat assembly.

While I have shown a two-ply tire in the drawing it will be understood that the method is not limited thereto and that tires of three or more plies can be constructed with equal or increased advantage.

Having thus described my invention, I claim:

1. The method of constructing single tube bicycle tires and the like which comprises, forming a band of carcass ply material of sufficient width to provide a plurality of plies about a drum, positioning additional bands of material on the drum in predetermined relation to said carcass band, and rolling said bands from one edge to the other to form a multi-ply tire, the initial relative positions of the bands being such that all the circumferential laps of the respective bands in the finished tire lie in substantially balanced proximity to the central radial plane of the tire.

2. The method of constructing single tube bicycle tires and the like which comprises, forming a band of carcass ply material of sufficient width to provide a plurality of plies about a drum, positioning a strip of lining stock in band formation upon the carcass band in predetermined relation to one edge thereof, forming the lining stock into a tube and rolling the tube into the carcass band to form a multi-ply tire, the initial relative positions of the bands being such that all the circumferential laps of the respective bands in the finished tire lie in substantially balanced proximity to the central radial plane of the tire.

3. The method of constructing single tube bicycle tires and the like which comprises, placing a strip of carcass ply material of sufficient width to provide a plurality of plies in band formation about a drum, positioning additional strips of material in band formation on the drum and in predetermined contacting relation with the carcass band, and rolling said bands from one edge to the other to form a multi-ply tire, the initial relative positions of the bands being such that all the circumferential laps of the respective bands in the finished tire lie in substantially balanced proximity to the central radial plane of the tire and at the crown of the tire.

4. The method of constructing single tube bicycle tires and the like which comprises, placing a strip of carcass ply material of sufficient width to provide a plurality of plies in band formation about a drum, positioning additional strips of material in band formation on the drum and in predetermined contacting relation with the carcass band, and rolling said bands from one edge to the other to form a multi-ply tire, the initial relative positions of the bands being such that all the circumferential laps of the respective bands in the finished tire lie in substantially balanced proximity to the central radial plane of the tire, the circumferential laps of the carcass band being positioned at the base of the tire.

5. The method of constructing single tube bicycle tires and the like which comprises, forming a band of carcass ply material about a drum, positioning a strip of lining stock in band formation upon the carcass band in predetermined relation to one edge thereof, forming the lining stock into a tube, inflating said tube and rolling said tube into the ply of carcass material.

6. The method of constructing single tube bicycle tires and the like which comprises, forming a band of carcass ply material about a drum, positioning additional strips of material in band formation on the drum and in predetermined relation to the band of carcass material, said additional strips including a strip of lining stock, forming said lining stock into a tube, inflating the so formed tube and thereafter rolling said tube into the bands formed by the carcass material and other strips to complete the tire.

In testimony whereof I have affixed my signature.

GEORGE F. WIKLE.